(12) United States Patent
Lucaci et al.

(10) Patent No.: US 8,947,199 B2
(45) Date of Patent: Feb. 3, 2015

(54) METHOD AND APPARATUS FOR ENABLING COMMUNICATION BETWEEN A FIRST DEVICE AND AT LEAST ONE FURTHER DEVICE

(75) Inventors: Razvan-Mihai Lucaci, Suceava (RO); Victor Berrios, Gilbert, AZ (US); Bogdan Hobinca, Iasi (RO); Nicusor Penisoara, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 418 days.

(21) Appl. No.: 12/991,834

(22) PCT Filed: Jun. 11, 2008

(86) PCT No.: PCT/IB2008/052306
§ 371 (c)(1),
(2), (4) Date: Nov. 9, 2010

(87) PCT Pub. No.: WO2009/150492
PCT Pub. Date: Dec. 17, 2009

(65) Prior Publication Data
US 2011/0057771 A1 Mar. 10, 2011

(51) Int. Cl.
*G05B 19/00* (2006.01)
*H04N 7/16* (2011.01)
*H04L 12/28* (2006.01)
*H04N 21/41* (2011.01)
*H04N 21/436* (2011.01)
(Continued)

(52) U.S. Cl.
CPC .............. *H04N 7/163* (2013.01); *H04L 12/282* (2013.01); *H04N 21/4126* (2013.01); *H04N 21/43615* (2013.01); *H04N 21/43637* (2013.01); *H04L 2012/2849* (2013.01); *H04W 48/17* (2013.01)
USPC ....... 340/5.5; 340/3.54; 340/4.11; 340/12.22; 700/12; 700/19; 700/275

(58) Field of Classification Search
CPC ..................... H04L 12/282; H04L 2012/2849; H04N 7/163; H04N 21/43615; H04N 21/43637; H04N 21/4126
USPC ............. 340/3.54, 5.5, 4.11, 4.12, 4.13, 4.14, 340/4.3, 4.31, 12.22, 12.23, 13.24, 12.5; 700/12, 19, 20, 275
See application file for complete search history.

(56) References Cited

U.S. PATENT DOCUMENTS

2002/0047774 A1* 4/2002 Christensen et al. ........ 340/3.54
2005/0068151 A1* 3/2005 Ushida .......................... 340/3.71
(Continued)

FOREIGN PATENT DOCUMENTS

DE 102006015016 B3 10/2007
EP 1503549 A 2/2005
(Continued)

OTHER PUBLICATIONS

International Search Report and Written Opinion correlating to PCT/IB2008/052306 dated Aug. 5, 2009.

*Primary Examiner* — Nabil Syed

(57) ABSTRACT

A controller node for an entertainment control network, comprises controller logic arranged to be paired with at least one controlled device over a wireless interface. The controller logic is further arranged to provide pairing information for the at lease one controlled device with which it is paired to a further node within the entertainment control network.

16 Claims, 6 Drawing Sheets

(51) Int. Cl.
*H04N 21/4363* (2011.01)
*H04W 48/00* (2009.01)

(56) References Cited

U.S. PATENT DOCUMENTS

2005/0188062 A1 8/2005 Li et al.
2005/0269196 A1* 12/2005 Brown et al. ............... 200/502
2005/0278462 A1 12/2005 Gillespie
2006/0126649 A1* 6/2006 Akiyoshi ..................... 370/401
2008/0031210 A1 2/2008 Abhishek et al.
2008/0310432 A1* 12/2008 Ranjan et al. ............... 370/401

FOREIGN PATENT DOCUMENTS

| WO | 01/97447 A | 12/2001 |
| WO | 2008/072035 A1 | 6/2008 |

* cited by examiner

METHOD AND APPARATUS FOR ENABLING COMMUNICATION BETWEEN A FIRST DEVICE AND AT LEAST ONE FURTHER DEVICE

FIELD OF THE INVENTION

The field of this invention relates to a method and apparatus for enabling communication between a first device and at least one further device. In particular, the field of this invention relates to a method and apparatus for enabling communication, within an entertainment control network, between a first controlled device and at least one further controlled device.

BACKGROUND OF THE INVENTION

With the advancement in wireless technologies, and the increasing diversity of entertainment systems, for example within a home environment, entertainment control networks have been developed, such as the RF (Radio Frequency) Entertainment Control Platform developed by Freescale™ Semiconductor, Inc, based on the IEEE 802.15.4 global standard for low-rate wireless personal area networks (PANs).

Typically, entertainment control networks comprise short range RF networks such as a PAN, comprising at least one controller node, for example in a form of a hand-held remote controller device, and one or more controlled entertainment devices, such as television sets, digital versatile disk (DVD) players, music systems, etc. The controller node acts as a central communication node, to and from which information and control messages may be sent, and through which messages between controlled entertainment devices may be routed.

A problem with current known implementations of entertainment control networks is that there is a requirement for the controller node to provide routing functionality between controlled devices and this requirement results in the complexity of the controller node increasing significantly beyond that of more traditional remote controller devices. Accordingly, greater processing capabilities, and/or additional processing logic is/are required, significantly increasing the cost of such a device.

A further problem with the requirement for the controller node to provide routing functionality between controlled devices is that this additional functionality results in increased power consumption of the controller node. As will be appreciated, in a case where the controller node is in the form of a hand-held remote controller device, the controller node may be battery powered. Accordingly, such an increase in power consumption is undesirable, since it will necessarily result in reduced battery life, or an increase in the battery capacity resulting in an increase in a size and/or weight of the device.

A still further problem with the requirement for the controller node to provide routing functionality between controlled devices is that, where a large number of controlled devices are attempting to communicate with one another, there is a need for such communication to be routed via the controller node necessarily, which results in a bottle-neck at the controller node. As a result, communication between controlled devices should be limited, in order to optimise available communication bandwidth, which in turn would limit the functionality and flexibility that may be provided to the entertainment devices. Furthermore, when a number of controlled devices attempt to communicate with one another, the need for such communications to be routed via the controller will typically result in a delay in such communications.

A still further problem with known entertainment control networks is that it is often the case a controller node is required to be paired with a plurality of controlled devices. Accordingly, when a new controller node is introduced into the entertainment control network, for example when a user wishes to migrate from a low-end remote control device to a more feature rich remote control device, the new controller node is required to perform the pairing operation with all controlled devices within the entertainment control network. In the case where there are a large number of controlled device, this can be a time consuming and tedious task for the user.

SUMMARY OF THE INVENTION

The present invention provides a method and apparatus for enabling communication, within an entertainment control network, between a first controlled device and at least one further controlled device as described in the accompanying claims.

Specific embodiments of the invention are set forth in the dependent claims.

These and other aspects of the invention will be apparent from and elucidated with reference to the examples of embodiments described hereinafter.

BRIEF DESCRIPTION OF THE DRAWINGS

Further details, aspects and examples of embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
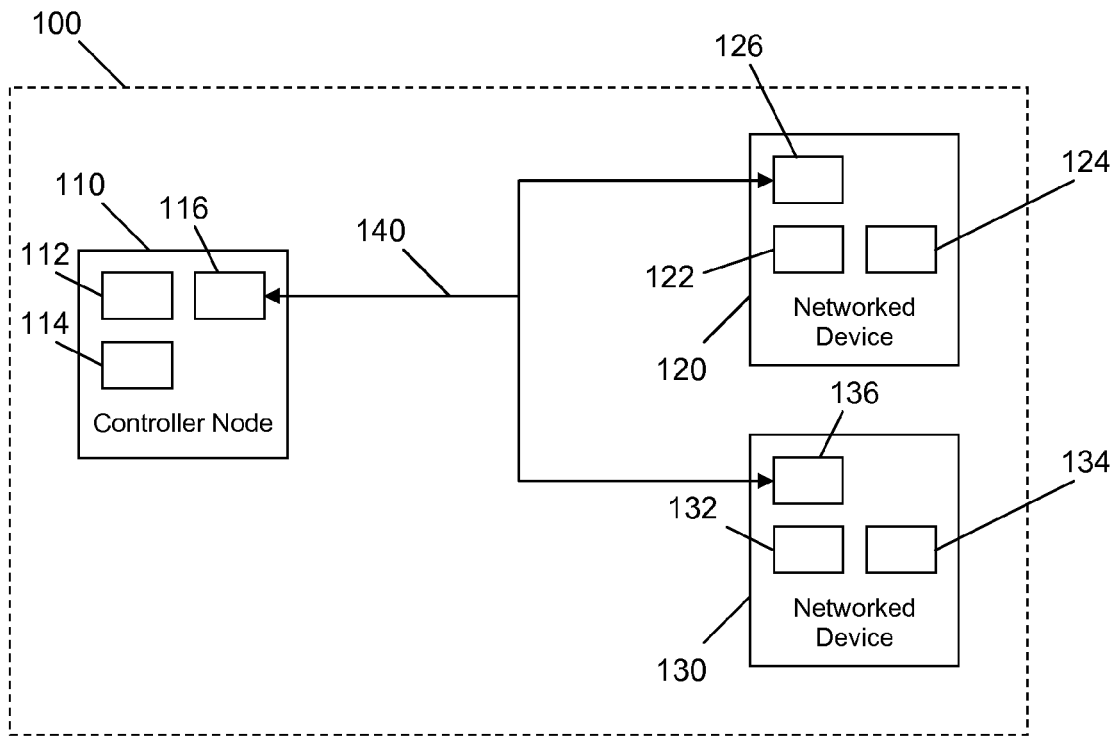
FIG. 1 illustrates an example of an entertainment control network.

Referring now to FIG. 1, there is illustrated an example of an entertainment control network 100 comprising a controller node 110 according to some embodiments of the present invention. The controller node 110 comprises controller logic 112 arranged to be paired with at least one controlled device, and to provide pairing information for the at least one controlled device with which it is paired to a further node within the entertainment control network 100. For the illustrated embodiment, the controller logic 112 is arranged to pair, by way of an exchange of pairing information, with a first controlled device 120 and at least one further controlled device 130 over a wireless interface 140, hereinafter referred to as 'on-line pairing'. For example, the wireless interface 140 may be in a form of an RF (Radio Frequency) interface, such as based on the international standard IEEE 802.15.4 (see http://www.ieee802.orq/15/) for low rate Personal Area Networks (PANs), and the controller node 110 may further comprise RF transceiver circuitry 116, operably coupled to the controller logic 112, and arranged to transmit and receive RF signals over the wireless interface 140.

In accordance with some embodiments of the invention, the controller node 110 may additionally or alternatively be paired with one or more controlled devices by way of 'off-line pairing', whereby the controller node is factory configured (e.g. provided within the software image therefore during manufacturing) with pairing information for one or more controlled devices, and the or each controlled devices is/are factory configured with pairing information for the controller node. It will be understood that the term 'pairing', and the state of being 'paired', will hereinafter refer equally to both on-line and off-line pairing.

An entertainment control network may be considered as a collection of devices logically connected by their usage for information (e.g. video, audio, text, etc.), entertainment (e.g. video, audio, games, etc.), comfort (e.g. lights, air conditioning, etc.) and accessible through remote control devices (controller devices), also optionally able to directly exchange information between themselves.

The controlled devices 120, 130 may also each comprise transceiver circuitry 126, 136, operably coupled to control logic 122, 132. In this manner, the control logic 112 of the controller node 110 is able to communicate with the control logic 122, 132 of each controlled device 120, 130, thereby exchanging pairing information with each controlled device 120, 130. The exchange of such pairing information is known as 'pairing', and provides a mechanism whereby authentication and the like may take place, as well as the provision of network information to the controlled devices. Once the process of 'pairing' has been successfully completed, the controller node and the controlled device are identified as being 'paired', and thus the controlled device may be considered to have 'joined' the network.

As previously mentioned, in accordance with some alternative embodiments of the invention, the controller node 110 may be paired with one or more controlled devices by way of 'off-line pairing'. As will be appreciated, in such a case, the exchange of pairing information between the controller node 110 and the controlled device(s) with which it was paired by way of off-line pairing is not necessary, since the controller node 110 and controlled device have previously been factory configured with each other's pairing information.

The controller node 110 and each of the controlled devices 120, 130 each comprise a memory element 114, 124, 134 respectively, which may be used to store personal pairing information, as well as pairing information received during one or more pairing processes. Memory elements 114, 124, 134 may further be used to store a computer program or other computer-readable code for programming controller logic 112 and control logic 122, 132 respectively.

Figure 2:
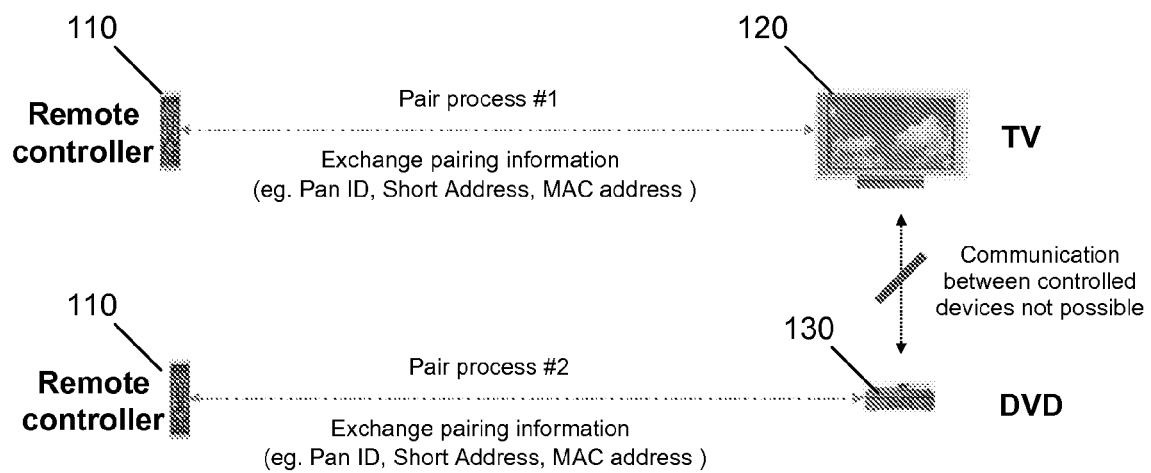
FIGS. 2 to 4 illustrate an example of communication processes between a controller node and controlled devices.

Referring now to FIG. 2, there is illustrated the controller node 110 of FIG. 1 pairing with the controlled devices 120, 130. The controller node 110 pairs with each of the controlled devices 120, 130 individually, for example by way of two separate pairing processes. Accordingly, the controller node 110 performs a first pair process with the first controlled device 120, which for the illustrated example is in a form of a television set, and performs a second pair process with the second controlled device 130, which for the illustrated example is in a form of a Digital Versatile Disc (DVD) player. During the pairing process, the controller node 110 and the respective controlled device 120, 130 exchange pairing information, such as, by way of example only, Personal Area Network Identification (PAN ID), short address, MAC (Medium Access Control) address, etc.

In accordance with some embodiments of the invention, a controlled device, such as one of the controlled device 120, 130, may establish its own PAN. In this manner, the entertainment control network in effect comprises a plurality of PANs established by the controlled devices. The short address in the controlled PAN may be assigned at pairing. The remote control will assume a PAN ID and corresponding assigned SHORT ADDRESS when it wishes to communicate with a particular controlled device 120, 130. The controller node 110 provides its MAC address to the controlled device 120, 130. The controlled device 120, 130 is subsequently able to identify the controller node 110 by way of its MAC address (substantially fixed for the controller node 110) and the PAN short address assigned to it by the controlled device 120, 130 (typically different for each controller device 120, 130).

Following a completion of the pairing processes, the controlled node 120, 130 is able to identify the controller node 110 as being a part of its PAN, and with which it may communicate, for example from which it may receive commands, and to which it may provide information etc.

As will be appreciated, traditionally direct communication between controlled devices is not practically feasible, at least not without user interaction. Any independent/autonomous interaction between two controlled devices may result in, for example, a television set communicating with a neighbour's DVD player, or similar.

For the illustrated examples, controlled devices in the form of a television set and a DVD player are illustrated. As will be appreciated, embodiments of the present invention are not limited to controlled devices in the form of television sets and DVD and/or video cassette players, and may alternatively comprise any suitable entertainment device, such as, by way of example only, music systems, media storage systems, games systems, television set top boxes, projector systems, controllable light and curtain/blind systems, or any other device or system that may be controlled by way of a controller node such as a handheld remote controller.

Figure 3:
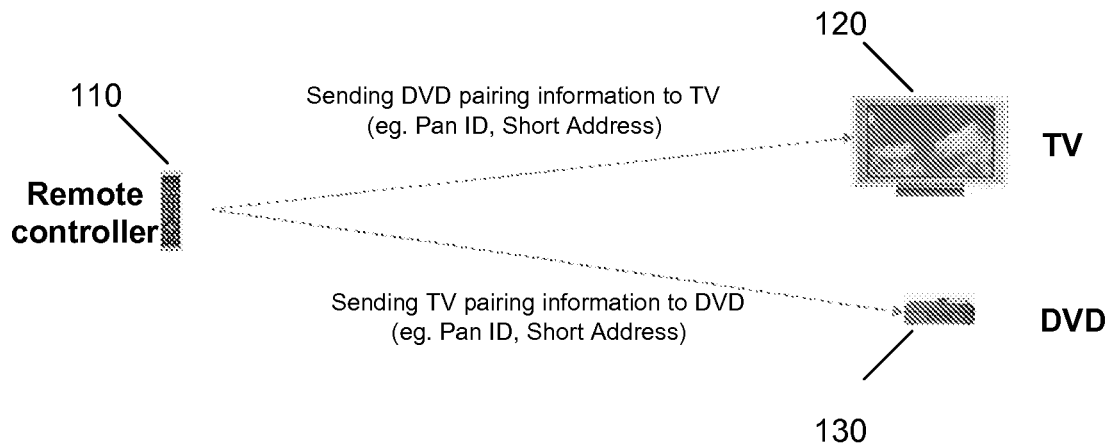

Referring now to FIG. 3, and in accordance with some embodiments of the invention, the controller logic 112 of the controller node 110 may be further arranged to provide pairing information for the first controlled device 120 with which it is paired to, for the illustrated example, the second controlled device 130 with which it is paired. The controller logic 112 may also provide pairing information for the second controlled device 130 to the first controlled device 120, such that the first and second controlled devices 120, 130 are subsequently able to communicate with one another substantially independently of the controller node 110.

Figure 4:
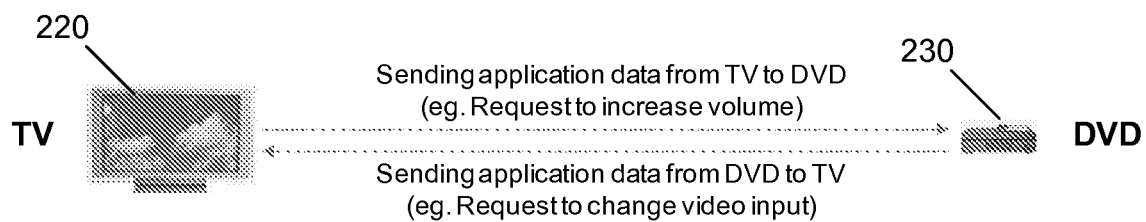

In this manner, and as illustrated in FIG. 4, the controlled devices 120, 130 are subsequently able to identify one another as being a part of the same network, and to communicate directly with one another, without the need to communicate via the controller node. In particular, the controlled devices 120, 130 are subsequently able to transmit and receive messages to/from one another without the messages having to be routed via the controller node 110. As a result, the number of messages being transmitted and received by the controller node 110 may be substantially reduced, thereby significantly reducing the congestion and bottle-neck problems associated with known controller nodes. As a result, communication between controlled devices is not required to be limited in the same way as for known entertainment control networks, thereby enabling functionality and flexibility provided to the controlled entertainment devices to be increased.

Furthermore, it is contemplated that substantially all communication between controlled devices may be performed directly in this manner, substantially alleviating the routing responsibilities of the controller node 110. Accordingly, by substantially removing the need for the controller node 110 to perform routing, it may no longer be necessary to provide the controller node 110 with routing functionality. Accordingly, the complexity of the controller node 110 may be significantly reduced, thus enabling costs of the controller node 110 to be significantly reduced.

Additionally, by substantially alleviating the routing responsibilities of the controller node 110, the power consumption of the controller node 110 may significantly be reduced. As will be appreciated, in a case where the controller node is in a form of a hand-held remote controller device, the controller node may be battery powered. Accordingly, such a reduction in power consumption is desirable, since it will necessarily result in increased battery life, and/or a reduction in the battery capacity resulting in a reduction in size and/or weight of the device.

In accordance with some embodiments of the present invention, the controller node 110, or more particularly for the illustrated example the controller logic 112, may be arranged, upon pairing with a new controlled device, to send pairing information for other controlled devices with which it is paired to the new controlled device, and to send pairing information for the new controlled device to the other controlled devices with which it is paired. In this manner, controlled nodes within the entertainment control network may be kept substantially up to date with pairing information for controlled devices joining the network.

Alternatively, and/or additionally, the controller node 110, or more particularly for the illustrated example the controller logic 112, may be arranged to send pairing information for controlled devices with which it is paired to a user-selected controlled device with which it is paired. Furthermore, the controller node 110 may send pairing information for the user-selected controlled device to other controlled devices with which it is paired, upon initiation by a user. In this manner, the user is able to enable the selected controlled device to be able to communicate directly with the other controlled devices with which the controller node is paired.

Figure 5:
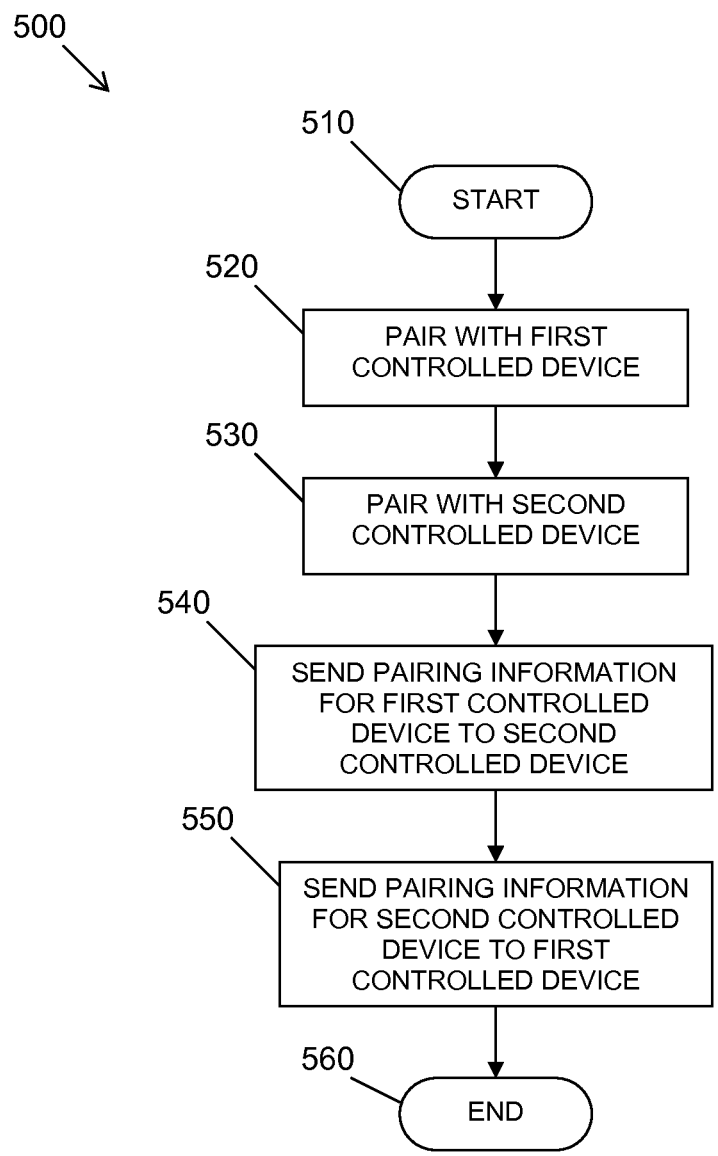
FIG. 5 illustrates a flowchart of an example of a method for enabling communication between a first controlled device and at least one further controlled device.

Referring now to FIG. 5, there is illustrated a simplified flowchart 500 of an example of a method for enabling communication, within an entertainment control network, between a first controlled device and at least one further controlled device according to some embodiments of the present invention, and which for example may be implemented by the controller node 110 illustrated in FIG. 1.

The method starts at step 510 and moves to step 520 where pairing information is exchanged with a first controlled device, which for the illustrated example is performed by way of a pairing process as previously described. Next, in step 530, pairing information is exchanged with at least one further controlled device, which for the illustrated example is performed by way of one or more pairing processes.

The method then moves to step 540, where pairing information for the first controlled device is sent to the at least one further controlled device. Next, in step 550, pairing information for the at least one further controlled device is sent to the first controlled device. The method then ends, at step 560. In this manner, the controlled devices are provided with pairing information for each other, thereby enabling them to communicate directly with one another. As a result, a controller node is not required to route messages between controlled devices.

Figure 6:
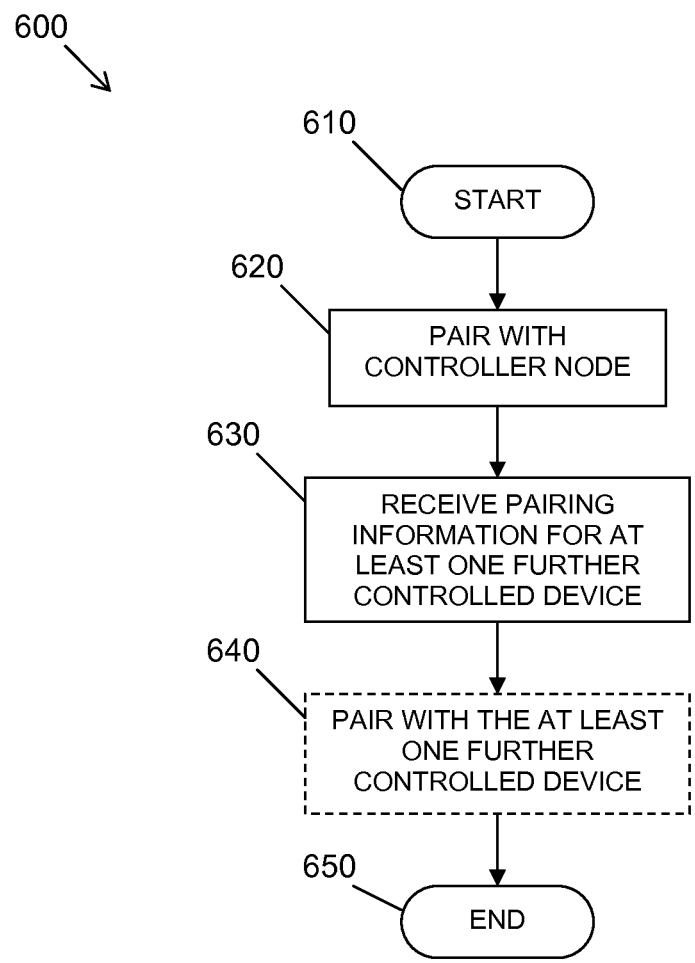
FIG. 6 illustrates a flowchart of a further example of a method for enabling communication between a first controlled device and at least one further controlled device.

Referring now to FIG. 6, there is illustrated a simplified flowchart 600 of a method for enabling communication, within an entertainment control network, between a first controlled device and at least one further controlled device according to an alternative embodiment of the present invention, and which for example may also be implemented by the controlled devices 120, 130 illustrated in FIG. 1.

The method starts at step 610 and moves to step 620 where pairing information is exchanged with a controller node, which for the illustrated example is performed by way of a pairing process. Next, in step 630, pairing information for the at least one further controlled device is received from the controller node. For the example illustrated in FIG. 6, the method then moves to optional step 640, where a pairing process with the at least one further controlled device is performed using the pairing information received from the controller node. The method then ends at step 650.

The pairing information received from the controller node may comprise, by way of example only, a PAN ID, MAC address, short address, etc. For example, in the case described above where a controlled device assigns a short address to the controller node for its own PAN, the controller node may provide the PAN ID for the PAN of a first controlled device along the short address assigned to it by that controlled device, and the short address for that controlled device to a second controlled device. The controller node may also provide the PAN ID for the PAN of the second controlled device and the short address assigned to it by that second controlled device and the short address for that second controlled device to a first controlled device. In this manner, the first controlled device may use the PAN ID and short addresses received from the controller node to establish communication with the second controlled device. Similarly, the second controlled device may use the PAN ID and short addresses received from the controller node to establish communication with the first controlled device. The pairing information may also comprise device type information for, and/or information about the capabilities of, the respective controlled devices. In this manner, the controlled devices are able to determine the capabilities of each other. A skilled artisan will appreciate that the aforementioned short address assigned for the controller node in the controlled node's pan is not necessarily required in this process.

As previously mentioned, a further problem with known entertainment control networks is that it is often the case that a controller node is required to be paired with a plurality of controlled devices. Accordingly, when a new controller node is introduced into the entertainment control network, for example when a user wishes to migrate from a low-end remote control device to a more feature-rich remote control device, the new controller node is required to perform the pairing operation with all controlled devices within the entertainment control network. In the case where there are a large number of controlled device, this can be a time consuming and tedious task for the user.

Figure 7:
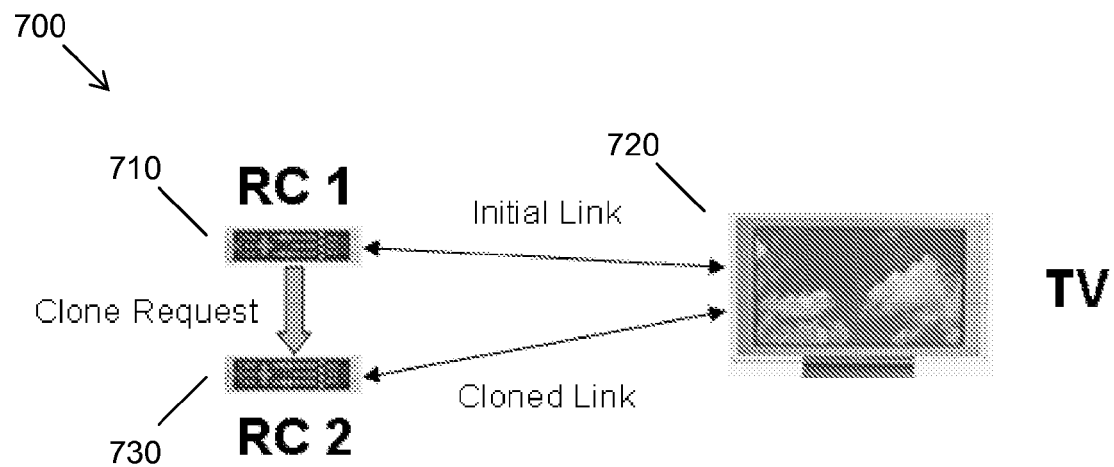
FIG. 7 illustrates an example of communication processes between a first controller node and a second controller node.

Referring now to FIG. 7, there is illustrated an example of communication processes between a first controller node and a second controller node within an entertainment control network 700 according to some alternative embodiments of the invention. For the embodiment illustrated in FIG. 7, signal processing logic (not shown) of a first controller node 710 is arranged to be paired with at least one controlled device 720, and to provide pairing information for the controlled device to a further controller node 730. In this manner, when the further controller node 730 is introduced into the entertainment control network 700, the (new) further controller node may be provided with pairing information for the or each controlled device 720 within the entertainment control network by the existing controller node 710. As a result, it is not necessary for the further controller node 730 to perform the pairing operation with individual controlled devices within the network, and thus significantly reducing the time and effort required to introduce the new controller node into the network.

In accordance with some embodiments of the invention, after the further controller node 730 has been provided with pairing information for the at least one controlled device 720, the further controller node 730 may update, for example, its MAC address to match the MAC address of the original controller node 710 from which it received the pairing information. In this manner, the further controller node 730 becomes a clone of the original controller node 710, enabling it to communicate with controlled devices within the network 700 in the same manner as the original controller node 710 without the need for any further pairing processes etc. with the controlled devices.

Figure 8:
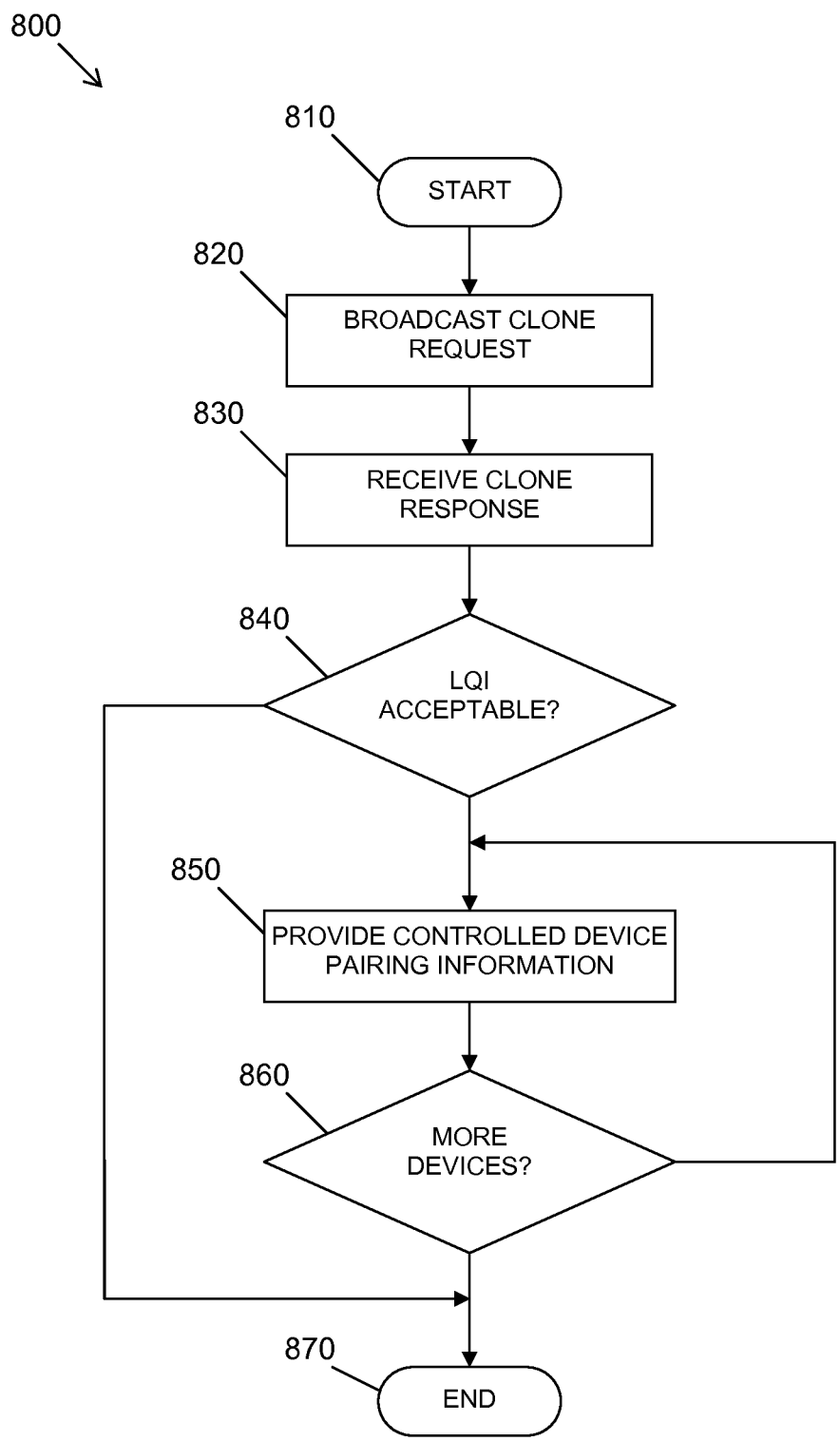
FIG. 8 illustrates an example of a method for enabling communication between a controller node and at least one controlled device.

Referring now to FIG. 8, there is illustrated an example of a simplified flowchart of a method for enabling communication between a controller node and at least one controlled device. For example, the method may be implemented by signal processing logic of the controller node 710 of FIG. 7. The method starts at step 810, and moves to step 820 where a clone request message is broadcast. Next, in step 830, a response to the clone request message is received, for example from the controller node 730 of FIG. 7. The method then moves to step 740, where it is determined whether a Link Quality Indication (LQI) is of an acceptable level. In this manner, the LQI provides an indication of the proximity of the node from which the response to the clone request message was received. If the LQI is too low, i.e. the LQI indicates that the responding node is too far away, the method ends at step 870. However, if the LQI is acceptable, i.e. the LQI indicates that the responding node is sufficiently close by, the method moves to step 850, where pairing information for a controlled device is provided to the node from which the clone response was received. Next, in step 860, it is determined whether pairing information for further controlled devices is still to be provided to the node from which the clone response was received. If further pairing information is still to be provided, the method loops back to step 850, and the further pairing information is provided to the responding node. Once pairing information for all controlled devices has been provided to the responding node, the method ends, at step 870.

In accordance with some embodiments of the invention, clone request messages may be transmitted over several communication channels, for example using a Channel Agility mechanism as a standard delivery layer of the entertainment control network.

In the foregoing specification, the invention has been described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms 'front,' 'back,' 'top,' 'bottom,' 'over,' 'under' and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term 'program,' as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A controller node for an entertainment control network, the controller node comprising:
   controller logic arranged to be paired with at least one controlled device over a wireless interface;
   wherein the controller logic is further arranged to provide pairing information for the at least one controlled device with which it is paired to a further controller node, wherein the pairing information includes a personal area network identification associated with the at least one controlled device, and to provide the personal area network identification for the at least one controlled device and a medium access control address of the controller node to the further controller node, wherein the further controller node is indistinguishable from the controller node in response to receiving the medium access control address of the controller node, wherein the controller logic is arranged to provide the pairing information for the at least one controlled device to at least one further controlled device within the entertainment control network, wherein the pairing information further includes Device capabilities of the at least one controlled device, wherein the at least one further controlled device is subsequently able to communicate with the at least one controlled device substantially independently of the controller node and wherein the at least one further controlled device is to utilize the capabilities of the at least one controlled device when communicating with the at least one controlled device.

2. The controller node of claim 1 wherein the controller logic is arranged to provide the pairing information for the at least one controlled device with which it is paired to the at least one further controlled device within the entertainment control network, and, upon pairing with a new controlled device, to provide pairing information for at least one other controlled device with which it is paired to the new controlled device, and to provide pairing information for the new controlled device to the at least one further controlled device with which it is paired.

3. The controller node of claim 1 wherein the controller logic is arranged to provide pairing information for a plurality of controlled devices with which it is paired to a user-selected controlled device with which it is paired, and to provide pairing information for the user-selected controlled device to the plurality of controlled devices with which it is paired upon initiation by a user.

4. The controller node of claim 1 wherein the at least one controlled device and the at least one further controlled device each comprise at least one from a group consisting of: a television; a Digital Versatile Disk (DVD) player; a music system; a video cassette player; a television set top box; a projector system; a controllable light system; a controllable curtain/blind system.

5. The controller node of claim 1 wherein the controller logic is arranged to broadcast a clone request message in order to identify the further controller node to which to provide the paring information for the at least one controlled device.

6. The controller node of claim 1 wherein the controller node is arranged to provide pairing information for the at least one controlled device with which it is paired to at least one further node within the entertainment control network over a wireless interface.

7. The controller node of claim 6 wherein the wireless interface comprises a Radio Frequency (RF) interface, and the controller node comprises RF transceiver circuitry, operably coupled to the controller logic, and arranged to transmit and receive RF signals over the RF interface.

8. The controller node of claim 7 further characterised in that the RF interface is based on the international standard IEEE 802.15.4 for low rate Personal Area Networks (PANs).

9. The controller node of claim 1 wherein the controller node comprises a user operated, hand-held remote controlled device.

10. A controlled device of an entertainment control network, the controlled device comprising:
    device logic arranged to be paired with a first controller node of the entertainment control network; wherein the device logic is further arranged to receive pairing information for at least one further controlled device from the first controller node, wherein the controlled device is subsequently able to communicate with the at least one further controlled device substantially independently of the first controller node, to communicate with a second controller node without distinguishing between the second controller node and the first controller node in response to the second controller node being a clone of the first controller node with all of the pairing information and a medium access control address of the first controller node, wherein the pairing information includes a personal area network identification associated with the at least one further controlled device, wherein the pairing information further includes Device capabilities of the at least one further controlled device, wherein the controlled device is to utilize the capabilities of the at least one further controlled device when communicating with the at least one further controlled device.

11. An entertainment control network comprising a controller node, a first controlled device and at least one further controlled device, the controller node being arranged to be paired with the first controlled device and the at least one further controlled device,
    wherein the controller node is further arranged to provide pairing information for the first controlled device to the at least one further controlled device, wherein the pairing information includes a personal area network identification associated with the first controlled device, and to provide pairing information for the at least one further controlled device to the first controlled device, wherein the first controlled device and the at least one further controlled device are subsequently able to communicate with one another substantially independently of the controller node, to provide pairing information including the personal area network identification for the first controlled device and the at least one controlled device with which it is paired to a further controller node, and to provide a medium access control address of the controller node to the further controller node, wherein the further controller node is indistinguishable from the controller node in response to receiving the medium access control address of the controller node, wherein the pairing information provided by the controller node to the at least one further controlled device within the entertainment control network includes Device capabilities of the first controlled device, wherein the at least one further controlled device is to utilize the capabilities of the first controlled device when communicating with the first controlled device.

12. The controller node of claim 2 wherein the controller logic is arranged to provide pairing information for a plurality of controlled devices with which it is paired to a user-selected controlled device with which it is paired, and to provide pairing information for the user-selected controlled device to the plurality of controlled devices with which it is paired upon initiation by a user.

13. The controller node of claim 2 wherein the first controlled device and the at least one further controlled device each comprise at least one from a group consisting of: a television; a Digital Versatile Disk (DVD) player; a music system; a video cassette player; a television set top box; a projector system; a controllable light system; a controllable curtain/blind system.

14. The controller node of claim 1 wherein the controller node comprises a user operated, hand-held remote controlled device.

15. The controller node of claim 1 wherein the controller logic is further arranged to receive a clone request message from the further controller node, to determine whether a link quality indication is above a predetermined level in response to receiving the clone request message, and to provide the pairing information and the medium access control address to the further controller node in response to the link quality indication being above the predetermined level.

16. The entertainment control network of claim 11 wherein the controller node comprises a user operated, hand-held remote controlled device.

* * * * *